(12) United States Patent
Kim et al.

(10) Patent No.: US 7,764,649 B2
(45) Date of Patent: Jul. 27, 2010

(54) HANDOVER METHOD AND SYSTEM IN A BROADBAND WIRELESS ACCESS COMMUNICATION SYSTEM

(75) Inventors: Jeong-Heon Kim, Anyang-si (KR); Young-Ky Kim, Seoul (KR); Jae-Ho Jeon, Seongnam-si (KR); Seung-Joo Maeng, Seongnam-si (KR); Ji-Ho Jang, Seoul (KR)

(73) Assignee: Samsung Electronics Co., Ltd (KR)

( * ) Notice: Subject to any disclaimer, the term of this patent is extended or adjusted under 35 U.S.C. 154(b) by 455 days.

(21) Appl. No.: 11/273,203

(22) Filed: Nov. 14, 2005

(65) Prior Publication Data

US 2006/0135164 A1    Jun. 22, 2006

(30) Foreign Application Priority Data

Nov. 12, 2004    (KR) .................. 10-2004-0092692

(51) Int. Cl.
*H04W 4/00* (2009.01)
(52) U.S. Cl. .................. 370/331; 370/332; 370/333; 370/334; 455/436; 455/437; 455/438; 455/439; 455/440; 455/441; 455/442; 455/443; 455/444; 455/432.1
(58) Field of Classification Search ......... 455/436–444, 455/432.1; 370/331–334
See application file for complete search history.

(56) References Cited

U.S. PATENT DOCUMENTS

| | | | |
|---|---|---|---|
| 6,490,260 B1 * | 12/2002 | Hwang | .................. 370/335 |
| 7,096,019 B2 * | 8/2006 | Wang | .................. 455/437 |
| 7,257,410 B2 * | 8/2007 | Chun et al. | .................. 455/455 |
| 2002/0119781 A1 * | 8/2002 | Li et al. | .................. 455/450 |
| 2003/0039317 A1 * | 2/2003 | Taylor et al. | .................. 375/295 |
| 2005/0048979 A1 * | 3/2005 | Chun et al. | .................. 455/443 |
| 2005/0096061 A1 * | 5/2005 | Ji et al. | .................. 455/450 |
| 2006/0014542 A1 * | 1/2006 | Khandekar et al. | .................. 455/447 |
| 2006/0029011 A1 * | 2/2006 | Etemad et al. | .................. 370/311 |
| 2008/0039107 A1 * | 2/2008 | Ma et al. | .................. 455/450 |

FOREIGN PATENT DOCUMENTS

| | | |
|---|---|---|
| JP | 06-311089 | 11/1994 |
| JP | 08-340575 | 12/1996 |
| JP | 2000-278734 | 10/2000 |
| JP | 2004-159345 | 6/2004 |

OTHER PUBLICATIONS

Wen Tong et al., "Flexible TDD frame for UL/DL Allocation", IEEE 802.16 Broadband Wireless Access Working Group, May 17, 2004.

* cited by examiner

*Primary Examiner*—Nghi H Ly
*Assistant Examiner*—Amancio Gonzalez
(74) *Attorney, Agent, or Firm*—The Farrell Law Firm, LLP (57) ABSTRACT

Disclosed is a hard handover method and system for use in a Broadband Wireless Access (BWA) communication system. The method and system includes dividing a data transmission field for mobile stations (MSs) into a handover field and a normal user field, allocating at least one subchannel in the normal user field to non-handover MSs located in a non-handover region, allocating at least one subchannel in the handover field to handover MSs located in a handover region, and performing communication through the allocated at least one subchannel.

14 Claims, 6 Drawing Sheets

HANDOVER METHOD AND SYSTEM IN A BROADBAND WIRELESS ACCESS COMMUNICATION SYSTEM

PRIORITY

This application claims the benefit under 35 U.S.C. §119 to an application entitled "Handover Method and System in a Broadband Wireless Access Communication System" filed in the Korean Intellectual Property Office on Nov. 12, 2004 and assigned Ser No. 2004-92692, the contents of which are incorporated herein by reference.

BACKGROUND OF THE INVENTION

1. Field of the Invention

The present invention relates generally to a Broadband Wireless Access (BWA) communication system, and in particular, to a method and system for supporting hard handover in a BWA communication system.

2. Description of the Related Art

In general, wireless communication systems have been developed so as to accommodate a plurality of users using various multiple access technologies. The most typical multiple access technology applied to wireless communication system is a Code Division Multiple Access (CDMA) scheme. The CDMA scheme has evolved from an early voice-oriented communication system into the current high-speed data communication system. The development of the CDMA scheme is attributable to the increasing users' demand for high-speed data transmission and the rapid development of communication technologies. The CDMA scheme has been adopted as a standard for most $3^{rd}$ Generation (3G) communication systems.

However, since the resources are limited in the CDMA scheme, it is difficult that data rate increases. Nevertheless, nowadays, the data rate required by users is increasing more and more. Therefore, in the wireless communication field, research is being undertaken to support the higher data rates.

For example, the research is being conducted on a communication method using an Orthogonal Frequency Division Multiple Access (OFDMA) scheme. The OFDMA scheme forms a plurality of channels using orthogonal frequencies, and allocates at least one channel to each of the users to transmit data. A brief description will now be made of a communication process performed in a communication system using the OFDMA scheme (hereinafter referred to as an "OFDMA communication system").

The OFDMA communication system uses a scheme for allocating uplink and downlink subchannels. For example, the OFDMA communication system is capable of distinguishing between uplink times and downlink times in a particular time band, and allocating the subchannels to the individual users in the time band. In the OFDMA-based cellular communication system, a method for managing available frequencies can be roughly divided into two methods. The "available frequency management method" refers to a frequency reuse factor management method.

A description will now be made of a first method, which can be considered most typical. The first method uses frequency reuse factors of, for example, 3 or 7, which is greater than 1. The reason for using the high frequency reuse factors will now be described in brief with reference to FIG. 1.

Figure 1:
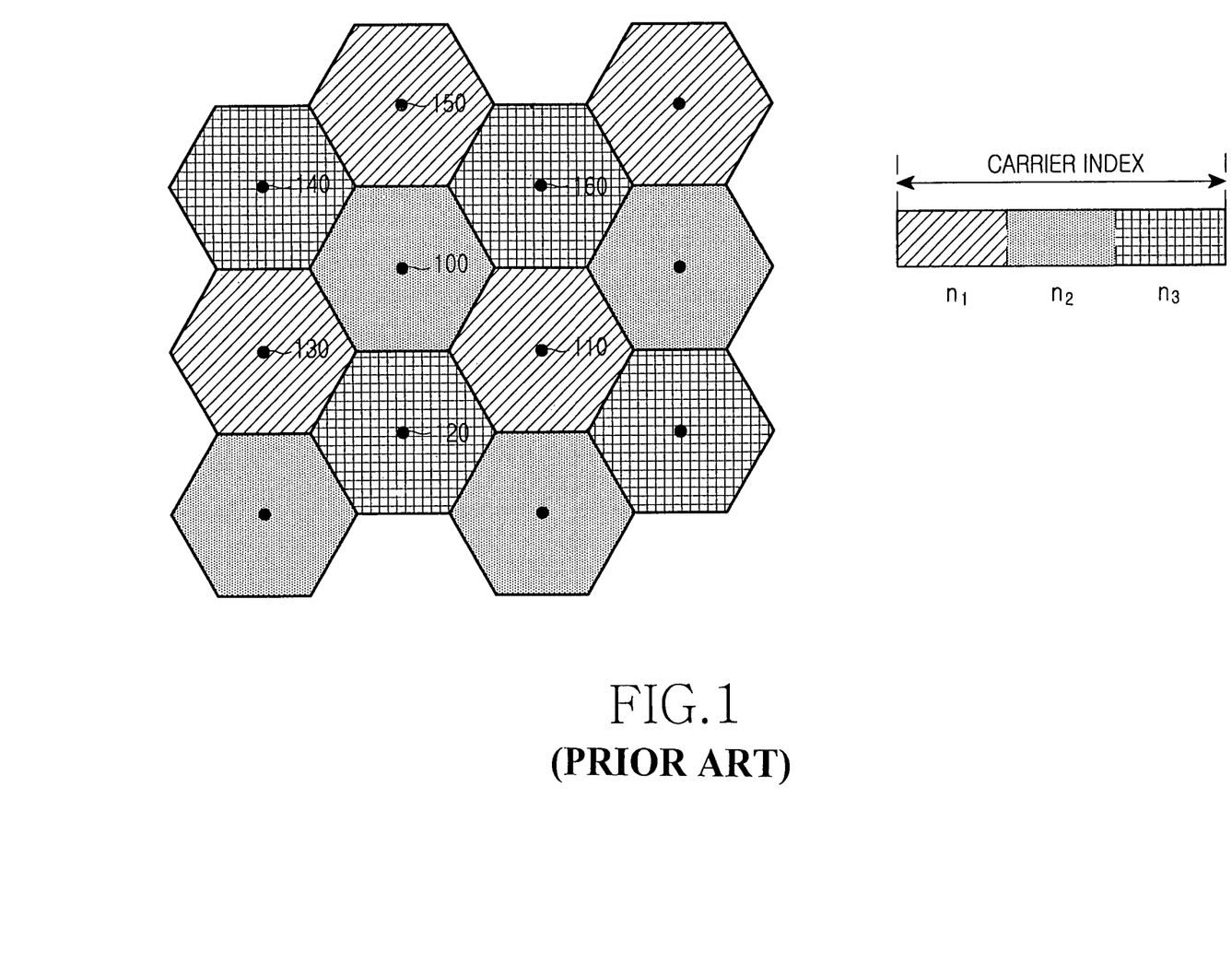
FIG. 1 is a diagram illustrating a frequency reuse scheme in a BWA communication system.

FIG. 1 is a diagram illustrating a frequency reuse scheme in a BWA communication system.

Referring to FIG. 1, base stations (BSs) 100, 110, 120, 130, 140, 150 and 160 form their own cells, and use different frequencies between neighboring cells. For example, one BS uses ⅓ of the total available frequencies. In FIG. 1, each of the BSs uses ⅓ of available carrier indexes. That is, each BS is designed to use only one of the total carrier indexes of $n_1+n_2+n_3$. For example, the neighboring BSs 110, 120, 130, 140, 150 and 160 of the BS 100 use the frequencies with the carrier indexes unused by the BS 100. By allowing the BSs to use the frequencies having different carrier indexes in this manner, it is possible to efficiently reduce interference between BSs.

When the total available frequencies are divided into 3 groups as shown in FIG. 1, the frequency reuse factor becomes 3. Generally, a BWA communication system, for example, a cellular system, implemented based on the foregoing method has a frequency reuse factor equal to or greater than 3. since it is difficult for all of the BSs to have the ideal cell structure shown in FIG. 1, the frequency reuse factor generally is a value between 3 and 7.

When the frequency reuse factor is a value between 3 and 7, it is impossible to use all of the frequencies. Herein, the number of carrier indexes available in a particular BS is proportional to the possible number of users or a possible data rate. Therefore, a decrease in the number of the carrier indexes restricts the possible number of users or the possible data rate. However, the use of the frequency reuse factor with a value between 3 and 7 contributes to an increase in signal-to-noise (SNR) even at a cell boundary.

Next, a method of using a frequency reuse factor of 1 will be described. In FIG. 1, if the frequency reuse factor is 1, each of the BSs can use frequencies for all of the carrier indexes. As described above, if the frequency reuse factor of 1 is used, frequency resource efficiency increases. However, it causes reduction of a signal-to-interference and noise ratio (SINR) for mobile stations (MSs) located in the cell boundary. That is, when the frequency reuse factor of 1 is used, MSs neighboring their cells have no difficulty in performing communication, but MSs located in the cell boundary suffer performance deterioration or cannot perform communication in some cases.

Due to these problems, in BWA communication system according to the prior art, most discussions were centered on the frequency reuse factor having a value equal to or greater than 3. Recently, however, the Institute of Electrical and Electronics Engineers (IEEE) 802.16 standard committee has discussed a method of using a frequency reuse factor of 1.

On the other hand, the communication system introduces the handover concept in order to secure mobility of MSs. The handover enables an MS in communication to seamlessly maintain the communication even through it moves between one BS, i.e., a source BS, and another BS, i.e., a target BS. The handover can be divided into three types of handovers which are known as a soft handover, a softer handover and a hard handover In the soft handover, while an MS in the source BS moves into the target BS, the MS receives signals from both BSs simultaneously and then eventually connects a call to the desired target BS. The softer handover is similar to the soft handover, but is different in that it is achieved in the same BS. That is, in the softer handover, when an MS moves between sectors in a BS, the BS provides the soft handover to the MS. Therefore, the softer handover is available only for a sectorized BS.

However, the hard handover instantaneously drops the ongoing call to a source BS when an MS in communication moves between BSs, and reconnects the call within the possible shortest time when the MS resumes communication to a target BS.

As described above, research is being undertaken on developing the method of using the frequency reuse factor of 1. In the general BWA communication system, for example, the OFDMA communication system, the hard handover is considered for handover. In this case, MSs located in a cell boundary experience a decrease in SINR during a hard handover, which causes a performance degradation and/or an increased call drop rate. The performance degradation and the increased call drop rate may reduce stability of the communication system. This will now be described with reference to FIG. 2.

Figure 2:
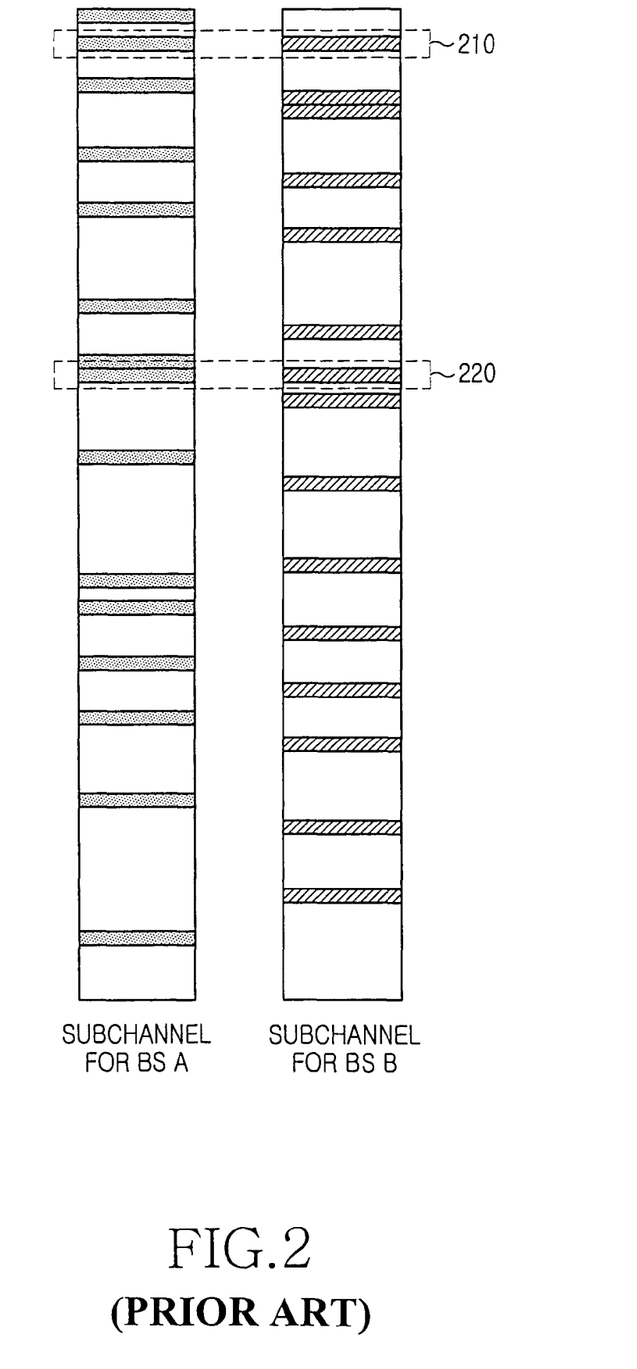
FIG. 2 is a diagram illustrating exemplary subchannels individually formed by different BSs in a general BWA communication system.

FIG. 2 is a diagram illustrating exemplary subchannels individually formed by different BSs in a general BWA communication system. A plurality of orthogonal frequencies for allocating one subchannel in a cell of a particular BS A, and orthogonal frequencies for allocating one subchannel in a cell of another BS B are shown in FIG. 2. Shaded parts in the cell of the BS A represent a plurality of frequencies for allocating one subchannel among the total orthogonal frequencies. Although the OFDMA communication system can sequentially allocate orthogonal frequencies for one subchannel, the OFDMA communication system may generally allocates a plurality of orthogonal frequencies for one subchannel randomly or based on information reported by an MS. Therefore, even in the cell of the BS B, orthogonal frequencies form one subchannel in the same method.

However, when the subchannels individually formed in the cell of the BS A and the cell of the BS B are allocated to, for example, two MSs which are located in the neighboring boundaries of their respective BSs, the two MSs are allocated the same orthogonal frequencies denoted by reference numerals 210 and 220. Serious interference can occurs between the identical orthogonal frequencies 210 and 220 at which collision takes place, causing a reduction in communication quality or a possible drop of the communication.

In addition, when power control is used in the communication system, a user located in the cell boundary transmits data with high power, causing serious interference to users located in other neighboring cells.

As described above, the hard handover causes a low SINR occurring due to the interference resulting from the identical frequencies allocated to users located in neighboring cells. Although the frequency reuse factor is set to a value greater than 1, i.e., to 3 or 7 in order to reduce the interference from the neighboring cells, it can need a special cell planning for allowing neighboring cells or sectors to use different frequencies. In addition, since the neighboring cells cannot use the same frequencies, the frequency efficiency noticeably decreases, giving difficulty in installing new BSs or extending the existing BSs.

SUMMARY OF THE INVENTION

It is, therefore, an object of the present invention to provide a method and system for reducing a call drop rate during handover in a Broadband Wireless Access (BWA) communication system.

It is another object of the present invention to provide a method and system for reducing a signal-to-interference and noise ratio (SINR) during handover in a BWA communication system.

It is further another object of the present invention to provide a method and system for improving communication quality during handover in a BWA communication system.

It is yet another object of the present invention to provide a method and system for reducing influence such as interference to neighboring cells during handover in a BWA communication system.

According to one aspect of the present invention, there is provided a method for providing handover in a broadband wireless access (BWA) communication system. The method includes dividing a data transmission field for mobile stations (MSs) into a handover field and a normal user field; allocating at least one subchannel in the normal user field to non-handover MSs; allocating at least one subchannel in the handover field to handover MSs; and performing communication through the allocated subchannels.

According to another aspect of the present invention, there is provided a method for providing hard handover in an orthogonal frequency division multiple access (OFDMA) communication system. The method includes determining whether predetermined MS is located in a handover region; and if the MS is located in the handover region, allocating at least one subchannel in a handover field from among all allocable subchannels to the MS using a predetermined frequency reuse factor.

According to another aspect of the present invention, there is provided a system for providing handover in a broadband wireless access (BWA) communication system. The system includes a base station (BS) for dividing a data transmission field for mobile stations (MSs) into a handover field and a normal user field, allocating subchannels in the normal user field to non-handover MSs, and allocating subchannels in the handover field to handover MSs; and an MS for communicating with the BS through at least one allocated subchannel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An exemplary embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention proposes a handover method and system in a Broadband Wireless Access (BWA) communication system. The proposed handover method and system allocates particular fields such that a signal-to-interference and noise ratio (SINR) is improved for the users located in a cell boundary, thereby improving performance of handover. In addition, the proposed handover method and system reduces the strength of interference signals to other cells caused by a handover user, thereby supporting stable handover and increasing the entire stability of the communication system.

Therefore, an embodiment of the present invention proposes a method capable of smoothly performing handover without cell planning, and reducing a call drop rate. In addition, the embodiment of the present invention proposes a method for reducing an SINR with the use of a frequency reuse factor of a value greater than 1 in some of downlink and uplink data transmission fields, thereby improving communication quality and reducing interference to neighboring cells.

For convenience, the embodiment of the present invention will be described herein with reference to an Orthogonal Frequency Division Multiple Access (OFDMA) communication system, which is a typical BWA communication system. However, the present invention is not limited to the OFDMA communication system, and can be applied to any communication system employing a multiple access scheme.

Before the present invention is described, the OFDMA communication system will be described below and the terms used herein will also be described.

The OFDMA communication system allocates resources to each user in an uplink and a downlink in units of a subchannel which is a set of particular subcarriers. There are several methods for creating the subchannel.

A method for creating a subchannel in a downlink of, for example, an Institute of Electrical and Electronics Engineers (IEEE) 802.16 OFDMA scheme includes Partial Usage Sub-Channel (PUSC), Full Usage Sub-Channel (FUSC), optional FUSC, Adaptive Modulation and Coding (AMC) permutation subchannel allocation methods. A method for creating a subchannel in an uplink includes PUSC, optional PUSC, and AMC permutation subchannel allocation methods.

All of the subchannel allocation methods except for the AMC permutation subchannel allocation method, basically allocate subcarriers randomly distributed over the full frequency band to one subchannel, thereby giving frequency diversity gain to each user allocated the subchannel.

In the uplink, for simplifying a channel estimation, the subchannel allocation methods may divide subcarriers into a predetermined number of subcarrier groups and create a subchannel based on the subcarrier group. For example, in an IEEE 802.16 OFDMA uplink, a PUSC subcarrier allocation scheme divides the total subcarriers into tiles, each of which is includes 4 subcarriers×3 symbols on the frequency-time axis, randomly selects the tiles, and creates a subchannel using the selected tiles. In the following description of a subchannel, the subcarriers can be replaced with subcarrier blocks.

The method of dividing the total subcarriers into subchannels is accomplished using a formula defined according to a method of creating the subchannels. The formula includes a parameter set such that different subchannels are created for individual cells. Although the parameter can be called in various ways, it will be called herein "cell identification (ID)." In addition, the subchannel creating methods described above will be commonly called "distributed subcarrier allocation scheme."

Referring back to FIG. 2, an exemplary arrangement of subcarriers that constitute subchannels allocated by the distributed subcarrier allocation scheme is shown. Cells A and B of two base stations (BSs) have different cell IDs. As described in connection with FIG. 2, collision occurs in two subcarriers among the subcarriers allocated to one subchannel.

Commonly, from the viewpoint of a subchannel, interference from a neighboring cell is determined depending on the number of collisions between subcarriers of subchannels allocated to one user and subcarriers of the total subchannels allocated in the neighboring cell. That is, in the distributed subcarrier allocation method, because subcarriers constituting a subchannel are randomly distributed over the full frequency band, collision or interference between subchannels in different cells depends on the number of allocated subchannels, on average, regardless of a particular subchannel.

Therefore, when allocating subchannels to handover mobile stations (MSs) using the distributed subcarrier allocation method, the embodiment of the present invention can adjust the amount of interference from neighboring cells by restricting the total number of allocated subchannels. An example of this will be described below.

Assume that when all subchannels are allocated, power of interference from a neighboring cell, which each subchannel experiences, is I. According to the embodiment of the present invention, the system predetermines a field to be allocated to the MSs that will perform hard handover, in the total subchannels. When 1/M of the all subchannels is allocated in the field, power of interference from the neighboring cell approximates 1/M in all of the subchannels. In this case, M is a predetermined number according to the subchannel allocation in the embodiment of the present invention. Therefore, hard handover users in neighboring cells are allocated a common field where the distributed subcarrier allocation method is used, and adjust the total number of subchannels allocated in this field, thereby performing communication with an SINR at which stable hard handover is possible.

A detailed description of this scheme will now be made with reference to the accompanying drawings.

Figure 3:
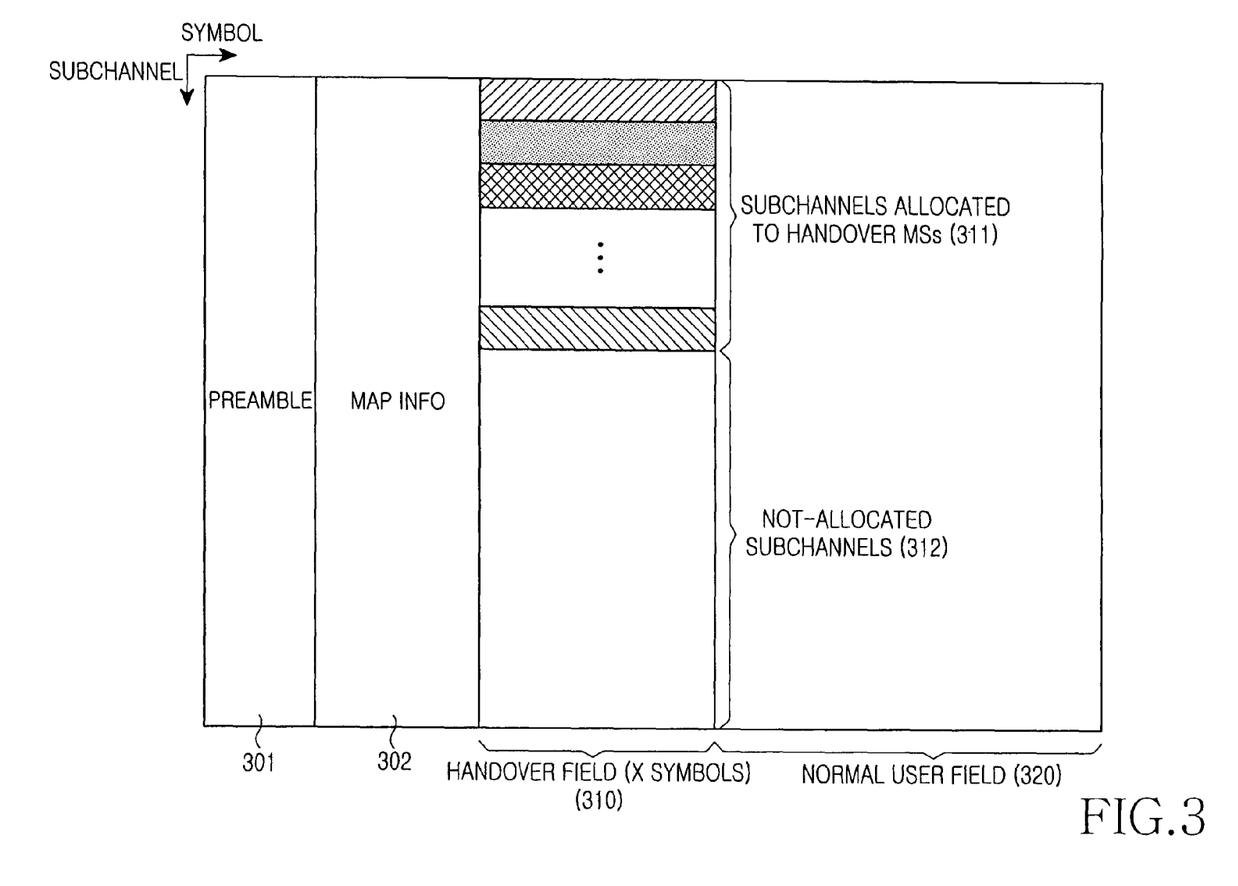
FIG. 3 is a diagram illustrating a format of a downlink frame in an OFDMA communication system according to an embodiment of the present invention.

FIG. 3 is a diagram illustrating a format of a downlink frame in an OFDMA communication system according to an embodiment of the present invention. FIG. 3 illustrates a method for allocating resources, for example, subchannels for hard handover users using a characteristic of the distributed subcarrier allocation scheme in a basic downlink frame for the OFDMA communication system.

As illustrated in FIG. 3, a downlink channel has a preamble field 301, a MAP information field 302, and data transmission fields 310 and 320. A first symbol in the downlink frame generally starts with the preamble 301. Therefore, each MS (or user) acquires synchronization of the downlink beginning at the preamble 301. The next several symbols of the preamble 301 transmit the MAP information 302 used for providing uplink and downlink subchannel allocation information to each MS. The MAP information 302 is followed by the data transmission fields 310 and 320 for data transmission. The data transmission fields 310 and 320 are divided into a handover field 310 for handover users and a normal user field 320 for normal users other than the handover users.

The exemplary subchannel allocation method of FIG. 3 sets up a predetermined number of, for example, X symbols in the data transmission fields 310 and 320 as the handover field 310 after the transmission of the MAP information 302, and sets up symbols after an end of the handover field 310 as the normal user field 320 to be allocated to the normal users not performing handover, other than the handover users. As described above, aside from the normal user field 320, the embodiment of the present invention includes the handover field 310 for allocating particular subchannels only to the MSs located in a handover region (hereinafter referred to as handover MSs) from among all of the subchannels allocable MSs.

The handover field 310 uses a frequency reuse factor with a value greater than 1 according to system conditions, whereas the normal user field 320 uses a frequency reuse factor with a value of 1. Therefore, resources of the normal user field 320 can create subchannels at the frequency reuse factor of 1, and are allocated to the individual MSs.

In addition, the handover field 310, as its frequency reuse factor is greater than 1, includes subchannels 311 allocated to handover MSs and subchannels 312 not-allocated to the handover MSs (i.e., allocated to non-handover MSs). Preferably, the handover field 310 uses the distributed subcarrier allocation scheme, and only particular subchannels, for example, the subchannels 311 allocated to the handover MSs, from among all of the subchannels allocable in the handover field 310, are allocated as shown in FIG. 3. Although the subchannels are shown adjacent to each other in FIG. 3 for convenience, they are actually distributed through the distributed subcarrier allocation scheme as described above. Therefore, the individual subchannels can be allocated according to the method of FIG. 2.

In this manner, the number of symbols in the handover field 310 and a ratio of the subchannels 311 allocable to handover MSs in the handover field 310 can be statistically determined during system operation. For example, it is possible to accumulate, for a predetermined period, statistics for a ratio of the handover users and an SINR at the cell boundary, and determine a preferred value for the ratio of the subchannels allocable to handover MSs using the accumulated values.

In FIG. 3, although the downlink frame is formed such that the handover field 310 is followed by the normal user field 320, the order is subject to change. At any rate, the objects of the present invention can be carried out if the subchannels are divided into two separate fields.

Figure 4:
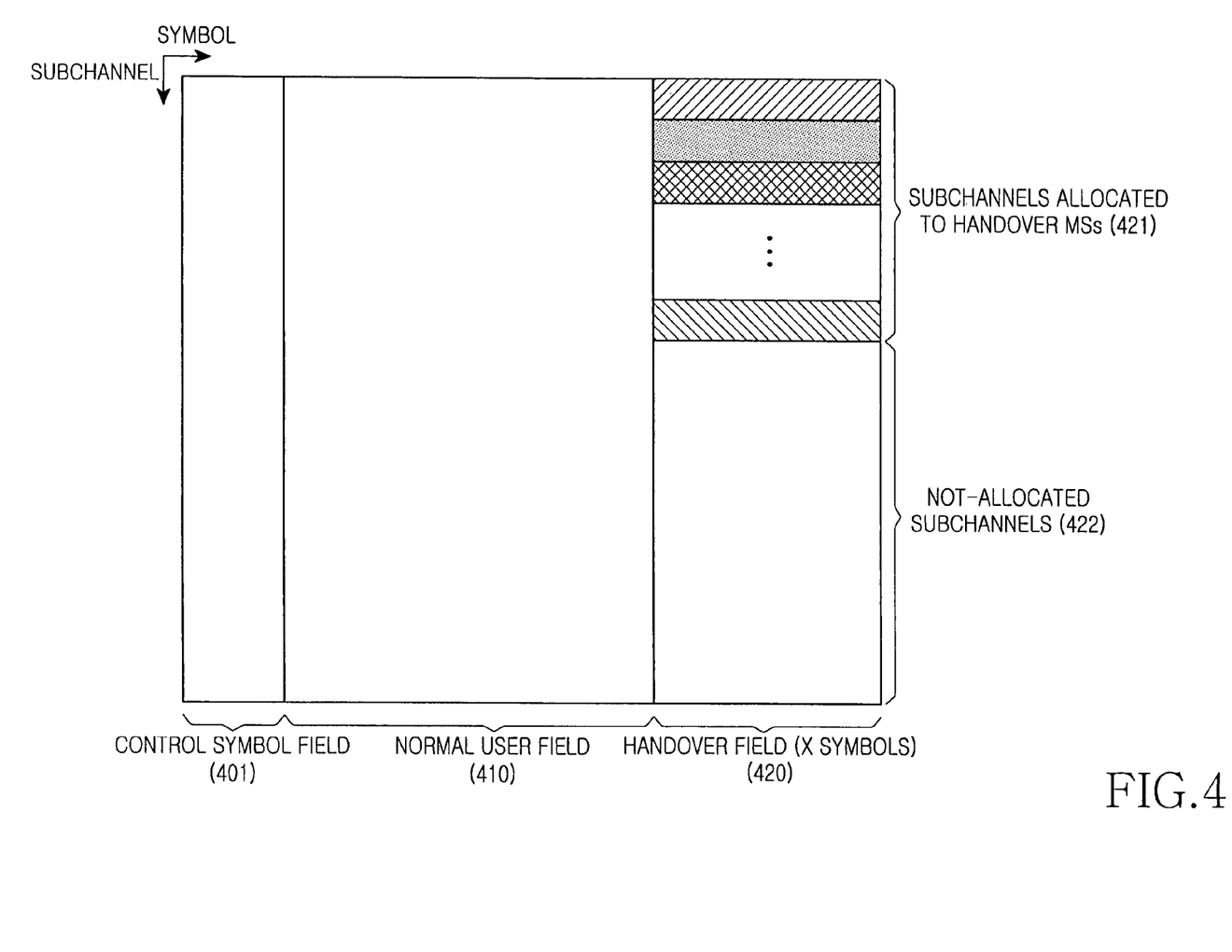
FIG. 4 is a diagram illustrating a method for allocating uplink subchannels in an OFDMA communication system according to an embodiment of the present invention.

FIG. 4 is a diagram illustrating a method for allocating uplink subchannels in an OFDMA communication system according to an embodiment of the present invention. A method for allocating resources, for example, subchannels for hard handover users using a characteristic of the distributed subcarrier allocation scheme in a basic uplink frame for the OFDMA communication system is shown in FIG. 4.

As illustrated in FIG. 4, the uplink channel includes a control symbol field 401 for transmitting ranging symbols and Hybrid Automatic Repeat reQuest (HARQ) response signals, and data transmission fields 410 and 420 for data transmission. Similarly, the data transmission fields 410 and 420 are divided into a normal user field 410 for normal users rather than handover users and a handover field 420 for the handover users.

Also, the uplink of FIG. 4 can be subject to handover field setup and subchannel allocation for handover users in the method used for the downlink of FIG. 3. For example, the exemplary subchannel allocation method of FIG. 4 sets up particular symbols in the data transmission fields 410 and 420 following the control symbol field 410 as the normal user field 410 to be allocated to normal users not performing handover, rather than handover users, and sets up a predetermined number of, for example, X symbols after an end of the normal user field 410 as the handover field 420. As described above, the embodiment of the present invention includes the handover field 420 for allocating particular subchannels only to the MSs located in a handover region.

Similarly, the handover field 420 uses a frequency reuse factor having a value greater than 1, and the normal user field 410 uses a frequency reuse factor of 1. As a result, resources of the normal user field 410 create subchannels allocated to non-handover users at the frequency reuse factor of 1, and are allocated to the individual MSs. Then the non-handover MSs are allocated subchannels in the normal user field 410 and transmit uplink data using the allocated subchannels.

Also, in the handover field 420 located after the normal user field 410, some (but not all) of the handover field's subchannels are used as described in connection with FIG. 3. That is, the handover field 420, as its frequency reuse factor is greater than 1, includes subchannels 421 allocated to handover MSs and subchannels 422 not-allocated to the handover MSs. Preferably, the handover field 420 uses the distributed subcarrier allocation scheme, and only particular subchannels, for example, the subchannels 421 allocated to the handover MSs, from among all of the subchannels allocable in the handover field 420, are allocated as shown in FIG. 4.

Although the subchannels are shown adjacent to each other in FIG. 4 for convenience, they are actually distributed using the distributed subcarrier allocation scheme as described above.

As described above, the embodiment of the present invention allocates partial subchannels to handover MSs thereby decreasing a probability that the same frequency resources may be allocated, as a whole and the full frequency band can be used.

Figure 5:
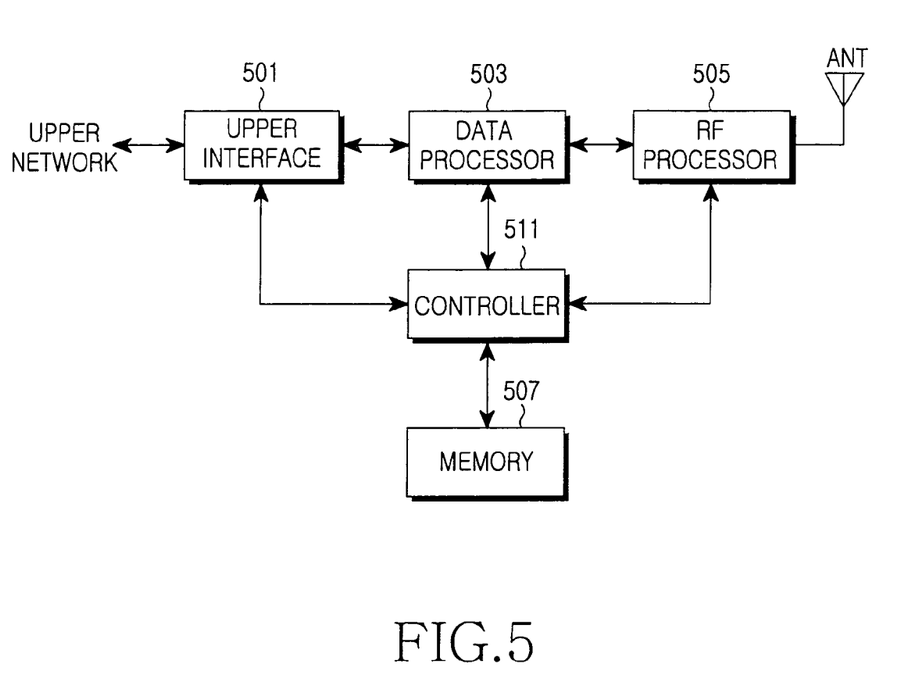
FIG. 5 is a block diagram schematically illustrating a structure of a BS in an OFDMA system, according to an embodiment of the present invention.

FIG. 5 is a block diagram schematically illustrating a structure of a BS in an OFDMA system, according to an embodiment of the present invention.

Referring to FIG. 5, the BS apparatus according to the embodiment of the present invention includes an upper interface 501, a data processor 503, a radio frequency (RF) processor 505, a controller 511, a memory 507, and an antenna ANT.

The BS includes the upper interface 501 for performing interfacing on data and control signals received from an upper network. The upper interface 501 is implemented with hardware logics, and its control is achieved by the controller 511. The upper interface 501 provides specific data received from the upper network to the data processor 503, and performs interfacing on the data to be delivered from the data processor 503 to the upper network. In addition, the upper interface 501 forwards a control signal delivered from the upper network to the controller 511, and forwards a control signal to be delivered from the controller 511 to the upper network, to a particular element in the upper network.

The data processor 503 is a block for processing data to be delivered to MSs or data received from the MSs. The data processor 503 processes the signals according to a corresponding communication scheme, for example, OFDMA. The RF processor 505 up-converts transmission signals into frequency signals in a communication band available for transmission/reception between the BS and the MSs, and transmits the up-converted signals over a wireless channel via the antenna ANT. In addition, the RF processor 505 down-converts RF signals received from the antenna ANT into signals in a baseband available in the data processor 503.

The controller 511 performs the overall control on the BS apparatus, and controls arrangement of symbols to be transmitted to MSs located in a handover region according to an embodiment of the present invention. Upon receiving a value of a ratio of subchannels allocable to handover MSs from the upper network, the controller 511 can update the ratio of subchannels allocable to handover MSs. In order to update the ratio of the subchannels allocable to the handover MSs, the controller 511 can perform a control operation of periodically delivering statistic values for the handover MSs to the upper network. If needed, the BS can be designed such that it updates a ratio of subchannels allocable to handover MSs using the statistic value. In this case, however, the BS is not identical in the ratio R to a neighboring BS, causing a region where the collision problem may occur. Therefore, it is preferable to perform the update on the ratio R of the subchannels allocable to handover MSs in the upper network.

The memory 507 temporarily stores program data for control by the controller 511 and data generated during the control, and stores a value of a ratio of subchannels allocable to handover MSs according to an embodiment of the present invention. The ratio values may be differently set for individual time bands. When the controller 511 provides statistic information for updating the ratio of the subchannels allocable to the handover MSs to the upper network, the memory 507 includes a separate area for storing the statistic values.

A description will now be made of a process of allocating, by the BS, downlink and uplink subchannels to MSs.

Figure 6:
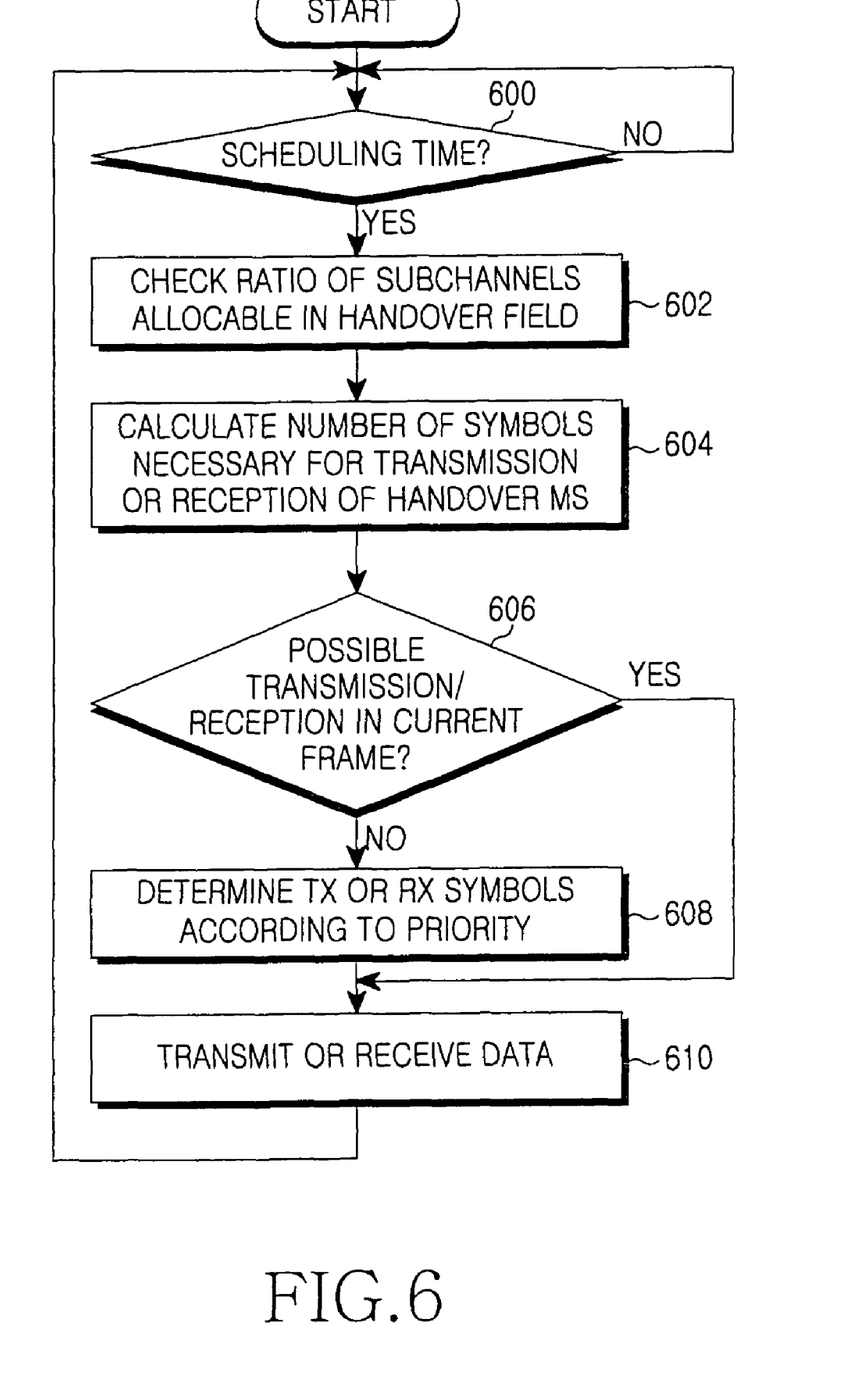
FIG. 6 is a flowchart illustrating an operation of allocating uplink and downlink subchannels to MSs by a BS according to an embodiment of the present invention.

FIG. 6 is a flowchart illustrating an operation of allocating uplink and downlink subchannels to MSs by a BS according to an embodiment of the present invention.

A subchannel allocation control method according to an embodiment of the present invention will now be described. If it is a scheduling time for a particular MS (step 600), a BS determines whether the corresponding MS is located in a handover region. If the MS is located in the handover region, the BS allocates subchannels in a handover field among all of the allocable subchannels to the MS using a frequency reuse factor having a value grater than 1.

In the process of allocating the subchannels in the handover field to the MS, it is preferable to allocate only some of the allocable subchannels in the handover field to the MS. In this case, the BS checks a ratio of subchannels allocable to the MS among the subchannels in the handover field and the number of symbols (steps 602 and 604). That is, the number of symbols to be set up as the handover field and the ratio of the subchannels to allocated in the handover field to the total allocable subchannel are statistically determined during system operation.

If the MS is not located in the handover region, the BS allocates subchannels in a normal user field for non-handover MSs among the total allocable subchannels to the MS using a frequency reuse factor of 1.

With reference to FIGS. 5 and 6, a detailed description will now be made of a control process for allocating, by a BS, uplink or downlink subchannels to an MS according to an embodiment of the present invention.

Referring to FIG. 6, a controller 511 of a BS determines in step 600 whether it is a scheduling time for a particular MS. If it is determined in step 600 that it is a scheduling time, the controller 511 proceeds to step 602 where it checks a value of a ratio of subchannel allocable to the MS among subchannels in a handover filed shown in FIG. 3 or 4, stored in a memory 507. As described above, the value of the ratio of the allocable subchannel can be either determined spontaneously by the BS or received from an upper network. It will be assumed herein that the number of uplink/downlink symbols constituting subchannels in a handover field has a predetermined value. Also, the number of uplink/downlink symbols can be either calculated spontaneously by the BS or received from the upper network. The number of uplink symbols constituting subchannels in the handover field may be different from the number of downlink symbols constituting subchannels in the handover field.

After checking the ratio of the allocable subchannels in the handover field, the controller 511 calculates the number of symbols necessary for transmission or reception of a handover MS in step 604. That is, the controller 511 calculates the number of downlink symbols to be transmitted to the handover MS and the number of uplink symbols transmittable by the handover MS. Also, the number of symbols necessary for transmission/reception, like the ratio of the allocable subchannels, can be predetermined according to system operation.

As described above, the embodiment of the present invention divides all cells in the same region, allocates subchannels for handover MSs using the foregoing control method, and allocates normal subchannels for non-handover MSs.

Next, a description will be made of an exemplary process of controlling a system operation after allocating the subchannels for the handover MS.

After completing the calculation in step 604, the controller 511 determines in step 606 whether data transmission/reception is possible in the current frame. That is, the controller 511 determines whether communication between the BS and the MS through uplink/downlink is possible in the current frame using the symbols. The determination can be made by comparing a value determined depending on a value of a ratio of subchannels allocable within the number of symbols allocable in the handover field during handover of the MS in the current frame with the actual number of uplink/downlink symbols for data transmission/reception.

As a result of the comparison, if the number of symbols for transmission/reception is less than the value of the ratio, the controller 511 determines that data transmission/reception is possible using the determined number of symbols. Otherwise, the controller 511 determines that the data transmission/reception (using the determined number of symbols) is impossible. That is, if it is determined in step 606 that the data transmission/reception is possible, the controller 511 proceeds to step 610. However, if it is determined in step 606 that the data transmission/reception is impossible, the controller 511 proceeds to step 608 where it selects transmission or reception symbols according to their priority.

In the exemplary method of FIG. 6, the BS does not change the number of symbols allocated to subchannels in the handover field every time. As a result, the controller 511 must transmit transmission data to a handover MS within the predetermined number of symbols. Therefore, the controller 511 determines the transmission or reception symbols taking into account MS priority or data characteristic priority, and then proceeds to step 610.

In an alternative method, if the controller 511 can change the number of symbols allocated to subchannels in the handover field every time, the controller 511 is allowed to change the number of symbols allocated to subchannels in the handover field, required according to the number of transmission/reception symbols in the current frame.

After step 606 or 608, the controller 511 arranges transmission/reception symbols in subchannels of the handover field, and also arranges transmission/reception symbols in subchannels of a normal user field, in step 610. That is, for data transmission/reception, the controller 511 allocates subchannels in the handover field to an MS located in a handover region using a frequency reuse factor having a value greater than 1, and allocates subchannels in the normal user field to an MS located in a non-handover region using a frequency reuse factor of 1. Thereafter, the controller 511 returns to step 600 where it determines whether it is a scheduling time for the next slot.

Although the exemplary method of FIG. 6 allocates subchannels to a particular MS at its scheduling time, the present invention is not limited to this. For example, the present invention can be adaptively applied to several system conditions, such as one case where a particular MS located in a handover region initiates a handover request and another case where a BS sends a handover indication to the MS located in the handover region. It is obvious to those skilled in the art that a technical structure thereof can be simply implemented through the embodiment of the present invention.

As can be understood from the foregoing description, in a BWA communication system supporting handover, the present invention improves an SINR for a user located in a cell boundary without separate cell planning, thereby enabling seamless handover. By doing so, it is also possible to reduce intensity of an interference signal to other cells, contributing to improvement in system stability.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for providing handover in an Orthogonal Frequency Division Multiple Access (OFDMA) communication system, comprising:
   a Base Station (BS) for dividing, according to symbols, a data transmission field that includes at least one subchannel allocable to at least one Mobile Station (MS) into a handover field that includes the at least one subchannel allocable to the at least one MS and a normal user field that includes the at least one subchannel allocable to the at least one MS, allocating at least one subchannel in the normal user field to at least one non-handover MS, and allocating at least one subchannel in the handover field to at least one handover MS using a distributed subcarrier allocation scheme; and
   an MS for communicating with the BS through the at least one subchannel in the handover field when the MS is located in a handover region during communication with the BS,
   wherein a frequency reuse factor of the at least one subchannel in the handover field is greater than 1 and a frequency reuse factor of the at least one subchannel in the normal user field is 1.

2. The system of claim 1, wherein a number of symbols in the handover field and a ratio of subchannels allocable to at least one handover MS in the handover field are statistically determined according to a ratio of handover MSs and a Signal-to-Interference and Noise Ratio (SINR) at a cell boundary.

3. A method for providing hard handover in an Orthogonal Frequency Division Multiple Access (OFDMA) communication system, the method comprising the steps of:
   determining whether at least one Mobile Station (MS) is located in a handover region;
   allocating at least one subchannel in a handover field to the at least one MS using a frequency reuse factor greater than 1 and a distributed subcarrier allocation scheme, if the at least one MS is located in the handover region; and
   allocating at least one subchannel in a normal user field for non-handover MSs to the at least one MS using a frequency reuse factor of 1, if the at least one MS is located in a non-handover region,
   wherein a data transmission field, which includes at least one subchannel allocable to the at least one MS from among a total of all allocable subchannels, is divided according to symbols. into the handover field and the normal user field, and
   wherein the handover field is allocated the at least one subchannel allocable to the at least one MS by a Base Station (BS), and
   wherein the normal user field is allocated the at least one subchannel allocable to the at least one MS by the BS.

4. The method of claim 3, wherein a number of symbols in the handover field and a ratio of subchannels allocable to at least one handover MS in the handover field are statistically determined according to a ratio of handover MSs and a Signal-to-Interference and Noise Ratio (SINR) at a cell boundary.

5. The system of claim 1, wherein a predetermined number of symbols in the data transmission field are set up as the handover field after a transmission of MAP information, and other symbols are set up after an end of the handover field as the normal user field;
   wherein the data transmission field is included in a channel including a preamble and the MAP information.

6. The system of claim 1, the handover field is located after the normal user field, and at least one of all subchannels allocable in the handover field are used in the handover field by the distributed subcarrier allocation scheme.

7. The system of claim 1, wherein the BS controls an arrangement of symbols to be transmitted to the at least one handover MS upon receiving a value of a ratio of subchannels allocable to the at least one handover MS from an upper network, and then the BS updates the ratio of subchannels allocable to the at least one handover MS.

8. The system of claim 1, wherein the BS determines whether it is possible to transmit or receive data in a current frame by comparing a value of a ratio of subchannels allocable within a number of symbols allocable in the handover field during handover of at least one handover MS in the current frame with an actual number of symbols for data transmission or reception.

9. The system of claim 8, wherein, when the actual number of symbols for data transmission or reception is less than the value, the BS determines that it is possible to transmit or receive data using the actual number of symbols, and
   wherein, when the actual number of symbols for data transmission or reception is greater than or equal to the value, the BS selects transmission or reception symbols according to priority.

10. The method of claim 3, wherein a predetermined number of symbols in the data transmission field are set up as the handover field after a transmission of MAP information, and other symbols are set up after an end of the handover field as the normal user field;
    wherein the data transmission field is included in a channel including a preamble and the MAP information.

11. The method of claim 3, the handover field is located after the normal user field, and at least one of all subchannels allocable in the handover field are used in the handover field by the distributed subcarrier allocation scheme.

12. The method of claim 3, wherein the BS controls an arrangement of symbols to be transmitted to at least one handover MS upon receiving a value of a ratio of subchannels allocable to the at least one handover MS from an upper network, and then the BS updates the ratio of subchannels allocable to the at least one handover MS.

13. The system of claim 3, wherein the BS determines whether it is possible to transmit or receive data in the current frame by comparing a value of a ratio of subchannels allocable within a number of symbols allocable in the handover field during handover of at least one handover MS in the current frame with an actual number of symbols for data transmission or reception.

14. The system of claim 13, wherein, when the actual number of symbols for transmission or reception is less than the value, the BS determines that it is possible to transmit or receive data using the actual number of symbols, and wherein, when the actual number of symbols for transmission or reception is greater than or equal to the value, the BS selects transmission or reception symbols according to priority.

* * * * *